United States Patent [19]

Malm

[11] 4,246,653
[45] Jan. 20, 1981

[54] IN-PHASE QUADRATURE DEMODULATOR FOR CPSK SIGNALS

[75] Inventor: Robert Malm, Los Angeles, Calif.

[73] Assignee: Northrop Corporation, Los Angeles, Calif.

[21] Appl. No.: 1,485

[22] Filed: Jan. 8, 1979

[51] Int. Cl.³ .......................................... H04L 27/22
[52] U.S. Cl. .................................. 375/82; 364/484; 370/20; 375/83; 328/133
[58] Field of Search ............... 325/320; 178/67, 88, 178/69.1; 328/133, 134; 329/122, 124, 50; 179/15 BC; 364/701, 702, 117, 480, 484; 375/53, 54, 80, 81, 82, 83, 86, 90, 97; 455/255, 258, 260; 331/1 A, 1 R, 25; 340/170, 207 P; 370/19, 20

[56] References Cited

U.S. PATENT DOCUMENTS

| | | | |
|---|---|---|---|
| 3,855,533 | 12/1974 | Schüeli | 370/20 |
| 4,076,956 | 2/1978 | Dogliotti et al. | 325/320 |
| 4,087,628 | 5/1978 | Sanders et al. | 178/88 |
| 4,100,499 | 7/1978 | Monrolin | 325/320 |
| 4,178,631 | 12/1979 | Nelson, Jr. | 364/484 |

Primary Examiner—Benedict V. Safourek
Attorney, Agent, or Firm—Edward A. Sokolski

[57] ABSTRACT

A system for demodulating a coherent, phase-shift-keyed signal that is modulated by a set of orthogonal or biorthogonal code words. The system does not require a local phase reference that is phase locked with the received signal. The system is made up of two demodulators and a microprocessor. One demodulator utilizes a local sinusoidal signal in the demodulation process, and the second uses a local cosinusoidal signal in the demodulation process. Because the phases of the local signals do not change significantly with respect to the unmodulated phase of the received signal during the period of time occupied by a single code word, the output of one or the other of the two demodulators resembles the code word which was transmitted. The set or orthogonal code words is compared with the outputs of the two demodulators to determine which code word was transmitted, and the data which corresponds to that code word is output by the system.

12 Claims, 3 Drawing Figures

IN-PHASE QUADRATURE DEMODULATOR FOR CPSK SIGNALS

BACKGROUND OF THE INVENTION

1. Field of the Invention

The system of this invention relates to the demodulation of coherent phase-shift-keyed signals. More particularly, this system applies to the demodulation of such signals that are modulated by orthogonal or bi-orthogonal codes.

2. Description of the Prior Art

Prior art systems for the demodulation of coherent phase-shift-keyed signals typically use a local phase reference signal which is phase locked to the unmodulated phase of the received signal. As a consequence, such systems normally require a "start-up" period at the beginning of operation during which the phase of the local reference signal is adjusted so as to lock onto or become in phase with the unmodulated phase of the received signal. As a consequence, in the systems of the prior art, an unmodulated signal is normally transmitted during this "lock in" period as no data is transmitted or received during this period. Furthermore, if phase synchronization or "lock in" is lost during the period when data is being transmitted, the data received while "lock on" is being re-established is lost. In some systems of the prior art, the transmission of data must be interrupted and an unmodulated signal transmitted in order to re-establish "lock on."

SUMMARY OF THE INVENTION

In the system of this invention, the demodulation process does not require a local signal to be phase locked with the unmodulated received signal. The system of this invention requires only that the phase of the local oscillator signal or signals remain more or less constant relative to the unmodulated phase of the received signal during the period of time occupied by a single code word.

In the system of this invention, the received signal, in effect, is demodulated by each of two demodulators, one demodulator utilizes a local sinusoidal signal in the demodulation process and the second uses a local cosinusoidal signal in the demodulation process. Because of the orthogonal relationship between the two reference signals that are utilized by the demodulators, at least one of the demodulators will have a significant output, and that output will resemble the modulation code word or its complement. By comparing the set of orthogonal or biorthogonal code words used in the modulation process with the outputs of the two demodulators, or with certain combinations of these outputs, the code word which was transmitted is determined and the data corresponding to the code word is output by the system.

DESCRIPTION OF THE PREFERRED EMBODIMENTS

Figure 1:
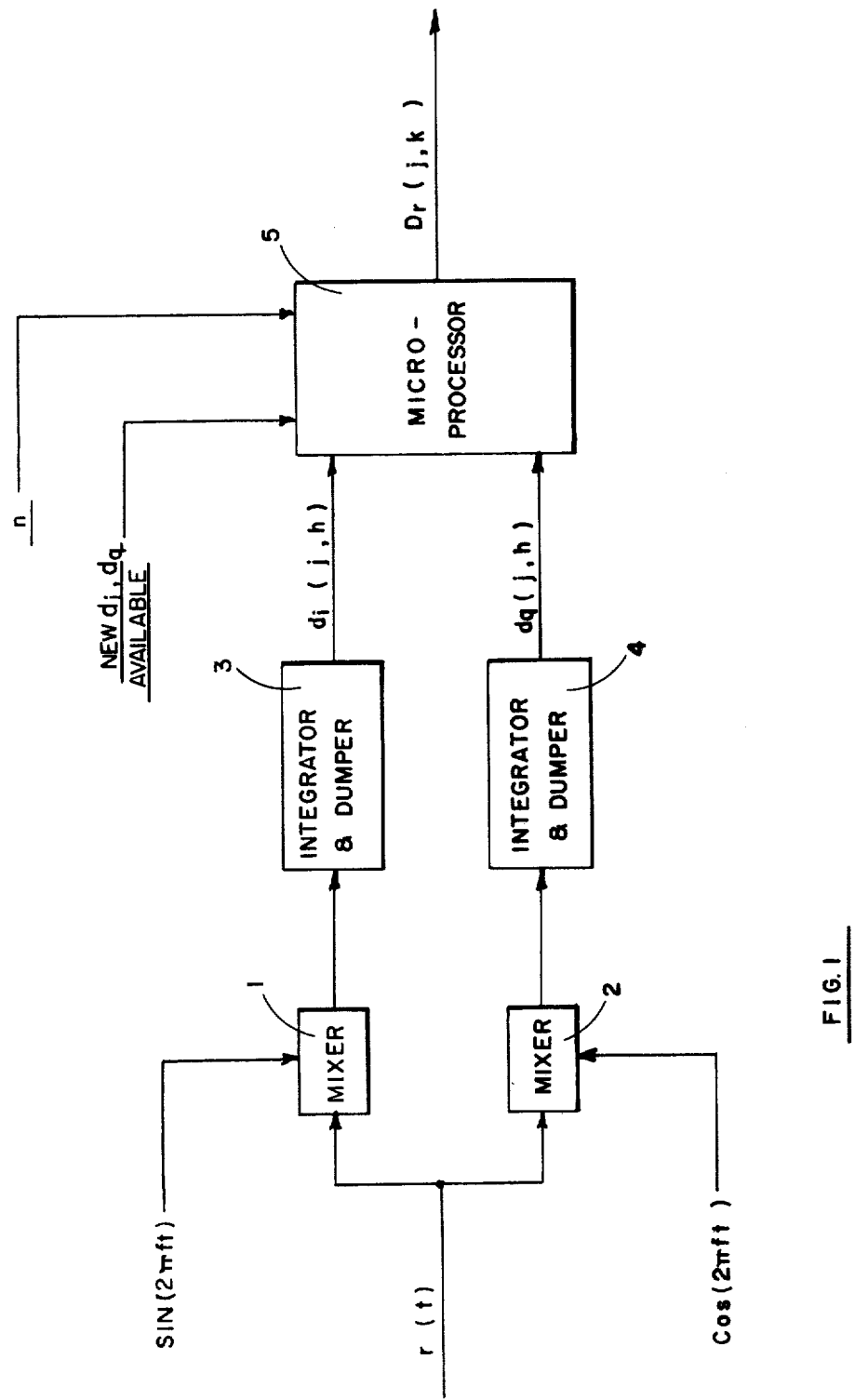
FIG. 1 is a block diagram of the invention.

The operation of the system when orthogonal code words are used is described first. Referring now to FIG. 1, the received signal, which is a coherent, phase-shift-keyed signal modulated by an orthogonal code, is input to mixer 1 where it is mixed with a local sinusoidal signal at the same frequency as that of the received signal. The received signal is also input to mixer 2 where the received signal is mixed with a cosinusoidal local signal of the same frequency as that of the received signal. Integrator and dumper 3 integrates the output of mixer 1 and dumps that output at the end of each keying interval into microprocessor 5. Integrator and dumper 4 integrates the output of mixer 2 and dumps that integral into microprocessor 5 at the end of each keying interval. Microprocessor 5 then compares the outputs of integrators and dumpers 3 and 4 over the sequence of keying intervals occupied by a single code word with the set of code words to determine which code word was transmitted. The microprocessor then outputs as the output of the system the data which corresponds to the transmitted code word. Two different ways for making this comparison are described in this specification.

The first process of comparison is called the IQD or in-phase quadrature process and is described by the following equations:

An orthogonally-coded CPSK signal s(t) is defined by the equation, $$s(t) = \sin[2\pi ft + D_i(j,n) \cdot \pi] \qquad (1)$$

where f is the carrier frequency, t is time, and $D_i(j,n)$ is the n'th bit of the particular code word transmitted during the j'th code period. For any code period j, $D_i$ will be one of the m different orthogonal code words, W(m), that are used by the system, that is, $$D_i(j,n) = W(m,n) \qquad (2)$$

where W(m,n) is the n'th bit of the m'th code word in the orthogonal set of code words.

For the purpose of numbering the code words within the orthogonal set, the numerical value for m can be defined simply by $$m = \sum_{k=0}^{K-1} D_i(j,k) 2^k \qquad (3)$$

where $D_i$ is the word input to the coder ($D_i(j,k)$ is the k'th bit of the j'th input word) and K is the number of bits in the input data word.

The received signal r(t) can be defined by the equation $$r(t) = A(t)\sin[2\pi ft + D_i(j,n) \cdot \pi + \theta(t)] \qquad (4)$$

where A(t) and $\theta(t)$ are slowly-varying amplitude and phase functions which describe the effect of the propagation medium on the transmitted signal.

The first demodulation process, denoted here as the in-phase quadrature process, is defined by the following equations.

$$d_i(j,n) = \frac{2}{A(t)T} \int_{\substack{n\text{'th bit} \\ j\text{'th code period}}} r(t) \sin(2\pi ft) dt \quad (5)$$

$$d_q(j,n) = \frac{2}{A(t)T} \int_{\substack{n\text{'th bit} \\ j\text{'th code period}}} r(t) \cos(2\pi ft) dt \quad (6)$$

$$C_i(j,m) = \sum_n [1 - 2W(m,n)] d_i(j,n) \quad (7)$$

$$C_q(j,m) = \sum_n [1 - 2W(m,n)] d_q(j,n) \quad (8)$$

The factor $[1-2W(m,n)]$ in the summation converts the sets of binary sequences of "0"s and "1"s, of which the $W(m)$'s are composed, into orthogonal series of $\pm 1$'s.

Figure 2:
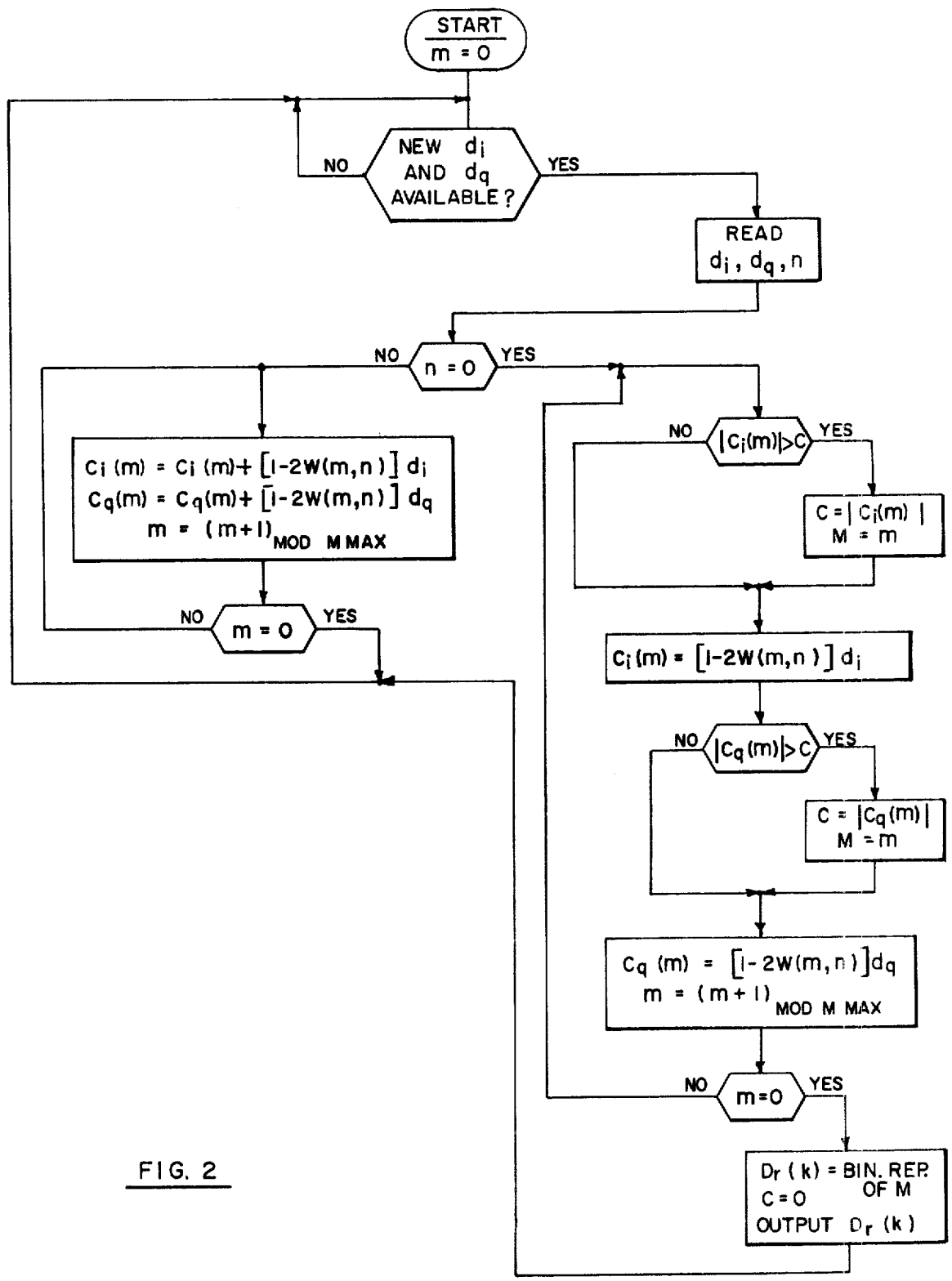
FIG. 2 is a flow diagram of the operation of the microprocessor in one mechanization of this invention.

The system of this invention selects the number M for which either $|C_i(j,M)|$ or $|C_q(j,M)|$ is the largest of all $|C_i(j,m)|$ and $|C_q(j,m)|$ and produces as its output the decoded character, $D_r(j,k)$ which corresponds to the binary representation of the number M. The microprocessor 5 implements the IQD process described by equations (7) and (8) and the selection of the largest $|C_i|$ or $|C_j|$ in the manner illustrated by the flow diagram in FIG. 2.

A somewhat better (and more complicated) demodulation process, which is denoted here as the second order in-phase quadrature demodulation or IQD² process, is defined by the equations given above together with those that follow.

$$C_x(j,m) = \frac{C_i(j,m) + C_q(j,m)}{\sqrt{2}} \quad (9)$$

$$C_y(j,m) = \frac{C_i(j,m) - C_q(j,m)}{\sqrt{2}} \quad (10)$$

$Z(j)$ is defined such that $$Z(j) = \begin{cases} IQ: \begin{cases} \{Z(j-1) = IQ\} \text{ AND } \{ |C(j-1,M)| \geq [ |C_x(j-1,M)|, |C_y(j-1,M)| ] \} \\ \text{OR} \\ \{Z(j-1) = XY\} \text{ AND } \{ |C(j-1,M)| < [ |C_x(j-1,M)|, |C_y(j-1,M)| ] \} \end{cases} \\ XY: \begin{cases} \{Z(j-1) + IQ\} \text{ AND } \{ |C(j-1,M)| < [ |C_x(j-1,M)|, |C_y(j-1,M)| ] \} \\ \text{OR} \\ \{Z(j-1) = XY\} \text{ AND } \{ |C(j-1,M)| \geq [ |C_i(j-1,M)|, |C_q(j-1,M)| ] \} \end{cases} \end{cases} \quad (11)$$

$$C(j,M) = \begin{cases} C_i(j,M); \{Z(j) = IQ\} \text{ AND } \{ |C_i(j,M)| \geq [ |C_i(j,m)|, |C_q(j,m)| ] \} \\ C_q(j,M); \{Z(j) = IQ\} \text{ AND } \{ |C_q(j,M)| \geq [ |C_i(j,m)|, |C_q(j,m)| ] \} \\ C_x(j,M); \{Z(j) = XY\} \text{ AND } \{ |C_x(j,M)| \geq [ |C_x(j,m)|, |C_y(j,m)| ] \} \\ C_y(j,M); \{Z(j) = XY\} \text{ AND } \{ |C_y(j,M)| \geq [ |C_x(j,m)|, |C_y(j,m)| ] \} \end{cases} \quad (12)$$

The system then produces as its output the character $D_r(j,k)$ which is the binary representation of the number M.

Figure 3:
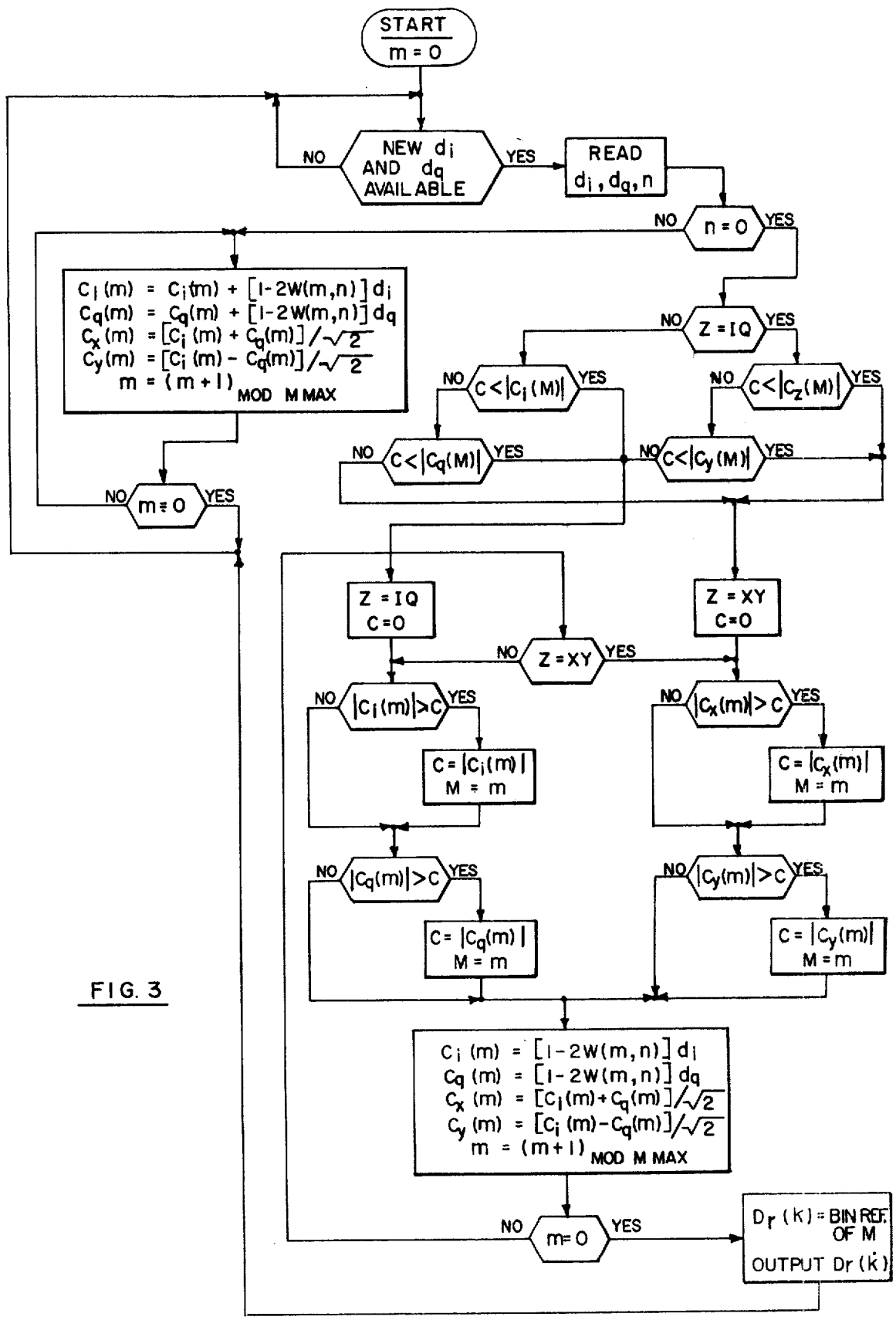
FIG. 3 is a flow diagram of the operation of the microprocessor in a second mechanization of this invention.

The microprocessor 5 implements the IQD² process described in equations (7) through (12) in the manner illustrated by the flow diagram in FIG. 3.

With a few modifications, the system of this invention also can be used with biorthogonal codes in order to avoid having to know absolute phase and still be able to distinguish between complementary codes. The K'th bit of each input character is differentially encoded. Thus $$D_d(j,k) = \begin{cases} D_i(j,k); k = 0,1,\ldots,K-2 \\ D_i(j,k) \oplus D_i(j-1,k); k = K-1 \end{cases} \quad (13)$$

where $D_i(j,k)$ is the input character and $D_d(j,k)$ is the differentially-encoded input character and $\oplus$ denotes modulus 2 addition.

One orders the code words so that the m'th code word (where $m < 2^{K-1}$) is the complement of the $(m + 2^{K-1})$'th code word. Then, $$D_i(j,n) = W(M_t,n) \oplus D_d(j,k=K-1) \quad (14)$$

where $$M_t = \sum_{k=0}^{K-2} D_d(j,k) 2^k \quad (15)$$

In this case the demodulation process, denoted here as the biorthogonal in-phase-quadrature process, which is equivalent to the IQD process, is defined by the following equations.

If $$|C_i(j,M)| \geq \{ |C_i(j,m)|, |C_q(j,m)| \} ; \begin{cases} m < 2^{K-1} \\ M < 2^{K-1} \end{cases} \quad (16)$$

then $$D_o(j,k) = \quad (17)$$

$$\text{Binary Representation} \left( M + 2^{K-2}[1 - SGN\{C_i(j,M) \cdot C_i(j-1,M)\}] \right)$$

If $$|C_q(j,M)| \geq \{ |C_i(j,m)|, |C_q(j,m)| \} ; \begin{cases} m < 2^{K-1} \\ M < 2^{K-1} \end{cases} \quad (18)$$

then $$D_o(j,k) = \quad (19)$$

$$\text{Binary Representation} \left( M + 2^{K-2}[1 - SGN\{C_q(j,M) \cdot C_q(j-1,M)\}] \right)$$

In this case the demodulation process denoted here as the biorthogonal second-order in phase quadrature process is defined by equations (16), (17), (18), and (19) when $Z(j) = IQ$. When $Z(j) = XY$, the equations below are used.

If $$|C_x(j,m)| \geq \{ |C_x(j,m)|, |C_y(j,m)| \} ; \begin{cases} m < 2^{K-1} \\ M < 2^{K-1} \end{cases} \quad (20)$$

-continued then
$$D_0(j,k) = \text{Binary Representation} \left( M + 2^{K-2} [1 - SGN\{C_x(j,M) \cdot C_x(j-1,M)\}] \right) \quad (21)$$

$$\text{If } \{|C_y(j,m)| \geq \{|C_x(j,m)|, |C_y(j,m)|\}\} : \begin{cases} m < 2^{K-1} \\ M < 2^{K-1} \end{cases} \quad (22)$$

then
$$D_0(j,k) = \text{Binary Representation} \left( M + 2^{K-2} [1 - SGN\{C_y(j,M) \cdot C_y(j-1,M)\}] \right) \quad (23)$$

The flow diagram for biorthogonal coding follows in a similar fashion from the equations given above.

The performance penalties associated with the IQD and IQD$^2$ processor, as compared to a demodulator which uses a perfect phase reference, are small when an orthogonal subset of (16,5) Reed-Muller codes are used. For a signal to noise ratio of 6.97 dB, the performance penalty for the IQD process is 1.4 dB while that for IQD$^2$ process is only 0.6 dB, that is, the IQD$^2$ process works as well as a perfect phase reference demodulator would have, but with a signal to noise ratio of 6.37 dB.

I claim:

1. A process for demodulating a coherent phase-shift-keyed signal that is modulated by a set of orthogonal code words representing input data comprising the steps of:
   (a) generating a reference sinusoidal signal and a reference cosinusoidal signal,
   (b) mixing the coherent phase-shift-keyed signal with the reference sinusoidal signal in a first mixer,
   (c) mixing the coherent phase-shift-keyed signal with the reference cosinusoidal signal in a second mixer,
   (d) integrating the output of the first mixer in a first integrator during each keying interval and dumping the output of the first integrator into a microprocessor at the end of each keying interval,
   (e) integrating the output of the second mixer in a second integrator during each keying interval and dumping the output of the second integrator into the microprocessor at the end of each keying interval,
   (f) repeating steps (2) through (5) for each of the keying intervals within a code word,
   (g) selecting, within the microprocessor, that particular code word which displays the greatest resemblance to the outputs from the first and second integrators, and
   (h) outputting the data which is represented by that particular code word.

2. The process described in claim 1 wherein the step of selecting, within the microprocessor, that particular code word which displays the greatest resemblance to the outputs from the first and second integrators comprises selecting that particular code word by means of the in-phase quadrature process.

3. The process described in claim 1 wherein the step of selecting, within the microprocessor, that particular code word which displays the greatest resemblance to the outputs from the first and second integrators comprises selecting that particular code word by means of the second order in-phase quadrature process.

4. A process for demodulating a coherent phase-shift-keyed signal that is modulated by a set of biorthogonal code words representing input data comprising the steps of:
   (a) generating a reference sinusoidal signal and a reference cosinusoidal signal,
   (b) mixing the coherent phase-shift-keyed signal with the reference sinusoidal signal in a first mixer,
   (c) mixing the coherent phase-shift-keyed signal with the reference cosinusoidal signal in a second mixer,
   (d) integrating the output of the first mixer in a first integrator during each keying interval and dumping the output of the first integrator into a microprocessor at the end of each keying interval,
   (e) integrating the output of the second mixer in a second integrator during each keying interval and dumping the output of the second integrator into the microprocessor at the end of each keying interval,
   (f) repeating steps (2) through (5) for each of the keying intervals within a code word,
   (g) selecting, within the microprocessor, that particular code word which displays the greatest resemblance to the outputs from the first and second integrators, and
   (h) outputting the data which is represented by that particular code word.

5. The process described in claim 4 wherein the step of selecting, within the microprocessor, that particular code word which displays the greatest resemblance to the outputs from the first and second integrators comprises selecting the particular code word by means of the biorthogonal in-phase quadrature process.

6. The process described in claim 4 wherein the step of selecting, within the microprocessor, that particular code word which displays the greatest resemblance to the outputs from the first and second integrators comprises selecting that particular code word by means of the biorthogonal second order in-phase quadrature process.

7. A system for demodulating a coherent phase-shift-keyed signal that is modulated by a set of orthogonal code words representing input data comprising:
   (a) a microprocessor
   (b) means for generating a reference sinusoidal signal and a reference cosinusoidal signal,
   (c) first mixer means for mixing the received signal with the reference sinusoidal signal
   (d) second mixer means for mixing the received signal with the reference cosinusoidal signal,
   (e) first integrator means for integrating the output of the first mixer during each keying interval and dumping the output into the microprocessor at the end of each keying interval,
   (f) second integrator means for integrating the output of the second mixer during each keying interval and dumping the output into the microprocessor at the end of each keying interval,
   (g) means for selecting, within the microprocessor, that particular code word which displays the greatest resemblance to the outputs from the first and second integrators for the keying intervals occupied by one code word, and
   (h) means for outputting the data which is represented by that particular code word.

8. The system described in claim 7 wherein the means for selecting, within the microprocessor, that particular code word which displays the greatest resemblance to the outputs from the first and second integrators for the keying intervals occupied by one code word comprises means for selecting that particular code word by means of the in-phase quadrature process.

9. The system described in claim 7 wherein the means for selecting, within the microprocessor, that particular code word which displays the greatest resemblance to the outputs from the first and second integrators for the keying intervals occupied by one code word comprises means for selecting that particular code word by means of the second order in-phase quadrature process.

10. A system for demodulating a coherent phase-shift-keyed signal that is modulated by a set of biorthogonal code words representing input data comprising:
  (a) a microprocessor,
  (b) means for generating a reference sinusoidal signal and a reference cosinusoidal signal,
  (c) first mixer means for mixing the received signal with the reference sinusoidal signal,
  (d) second mixer means for mixing the received signal with the reference cosinusoidal signal,
  (e) first integrator means for integrating the output of the first mixer during each keying interval and dumping the output into the microprocessor at the end of each keying interval,
  (f) second integrator means for integrating the output of the second mixer during each keying interval and dumping the output into the microprocessor at the end of each keying interval,
  (g) means for selecting, within the microprocessor, that particular code word which displays the greatest resemblance to the outputs from the first and second integrators for the keying intervals occupied by one code word, and
  (h) means for outputting the data which is represented by that particular code word.

11. The system described in claim 10 wherein the means for selecting, within the microprocessor, that particular code word which displays the greatest resemblance to the outputs from the first and second integrators for the keying intervals occupied by one code word comprises means for selecting that particular code word by means of the biorthogonal in-phase quadrature process.

12. The system described in claim 10 wherein the means for selecting, within the microprocessor, that particular code word which displays the greatest resemblance to the outputs from the first and second integrators for the keying intervals occupied by one code word comprises means for selecting that particular code word by means of the biorthogonal second order in-phase quadrature process.

* * * * *